United States Patent
Miyake et al.

(12) 
(10) Patent No.: US 6,936,662 B2
(45) Date of Patent: Aug. 30, 2005

(54) POLYVINYL ACETAL RESIN FOR COATING AND INK, AND COATING AND INK COMPOSITIONS

(75) Inventors: Yoshitaka Miyake, Koka-gun (JP); Hironobu Shimazu, Koka-gun (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 10/473,296

(22) PCT Filed: Mar. 25, 2002

(86) PCT No.: PCT/JP02/02821

§ 371 (c)(1),
(2), (4) Date: Mar. 3, 2004

(87) PCT Pub. No.: WO02/079281

PCT Pub. Date: Oct. 10, 2002

(65) Prior Publication Data

US 2004/0157987 A1 Aug. 12, 2004

(30) Foreign Application Priority Data

Mar. 28, 2001 (JP) ...................................... 2001-093378

(51) Int. Cl.$^7$ .............................................. C08C 19/34
(52) U.S. Cl. ........................ 525/386; 525/383; 525/61; 525/56
(58) Field of Search ............................ 525/61, 56, 383, 525/386

(56) References Cited

U.S. PATENT DOCUMENTS

| | | | | |
|---|---|---|---|---|
| 4,743,409 A | * | 5/1988 | Nomura et al. | ............. 264/1.33 |
| 5,866,654 A | * | 2/1999 | Fuss et al. | ..................... 525/56 |
| 6,027,573 A | | 2/2000 | Cercone et al. | |

FOREIGN PATENT DOCUMENTS

| | | |
|---|---|---|
| EP | 1 270 608 A1 | 1/2003 |
| JP | 5301916 | 11/1993 |
| JP | 6228227 | 8/1994 |
| JP | 7020599 | 1/1995 |
| JP | 07-020599 | * 1/1995 |
| JP | 10-338713 A | * 12/1998 |
| JP | 11349889 | 12/1999 |
| JP | 2000235243 | * 8/2000 |

OTHER PUBLICATIONS

Patent Abstracts of Japan. vol. 1999, No. 03, Mar. 31, 1999 & JP 10 338713 A (Sekisui Chemical Co., Ltd.), Dec. 22, 1998.

* cited by examiner

Primary Examiner—Ling-Sui Choi
(74) Attorney, Agent, or Firm—Connolly, Bove, Lodge & Hutz, LLP

(57) ABSTRACT

It is an object of the invention to provide a polyvinyl acetal resin for lacquer and ink, which can suppress the occurrence of coloring and foul odor of the polyvinyl acetal resin itself even when no antioxidant is used at all therein, and a lacquer and ink composition which has excellent color and the high stability of viscosity in storing it for long periods. The invention provides a polyvinyl acetal resin for lacquer and ink synthesized by acetalization reactio of polyvinyl alcohol and an aldehyde, wherein a polymerization degree is 100 to 3,000, a proportion of a residual acetyl group is 25 mol % or less and a proportion of a residual hydroxyl group is 17 to 35 mol %; a content of the residual aldehyde is 100 ppm or less, a content of residual butyric acid is 100 ppm or less, a content of residual 2-ethyl-2-hexenal is 100 ppm, and a content of a residual acid catalyst is 300 ppm or less, and no antioxidant is remained at all therein.

3 Claims, No Drawings

POLYVINYL ACETAL RESIN FOR COATING AND INK, AND COATING AND INK COMPOSITIONS

TECHNICAL FIELD

The present invention relates to a polyvinyl acetal resin for lacquer and ink, which can suppress the occurrence of coloring and a foul odor of the polyvinyl acetal resin itself even when no antioxidant is used at all therein, and to a lacquer and ink composition which has excellent color and the high stability of viscosity in storing it for long periods.

BACKGROUND ART

Lacquer and ink are formed by adding coloring agents and other additives in response to their uses to solvents by the medium of binder resins. Polyvinyl acetal resins are used as a binder resin in the field of lacquer and ink because of high characteristics in a film formation property, dispersibility of a pigment, adhesion property to a surface to be coated and alcohol-solubility.

A polyvinyl acetal resin is normally prepared by using an acid catalyst to polyvinyl alcohol and reacting it with an aldehyde. But, when the polyvinyl acetal resin is prepared by this method, there were problems that since the aldehyde remains in the polyvinyl acetal resin, the polyvinyl acetal resin was colored due to the occurrence of oxides of the aldehyde and reactants of aldehydes with each other and therefore color of a lacquer and ink composition to be formed was changed, and a foul odor was generated, and the viscosity of the lacquer and ink composition was increased during being stored for long periods. In Japanese Kokai Publication Hei-11-349889, there is disclosed printing ink and lacquer containing polyvinyl butyral resin which uses polyvinyl acetal partially hydrolyzed as a raw material, but there is no description of a foul odor or storage stability for long periods.

Further, when a polyvinyl acetal resin is prepared by acetalization of polyvinyl alcohol, an antioxidant is normally added to a reaction system or into resin for the protection of the aldehyde against oxidation and for the protection against oxidation and an improvement in heat resistance of the polyvinyl acetal resin to be formed. However, since the antioxidant reduces the dispersibility of a pigment of a lacquer and ink composition to be obtained and further has a problem in a safety point when it is used as ink material for the packaging of foods and pharmaceutical products, an amount of the antioxidant used needed to be restricted to the utmost.

SUMMARY OF THE INVENTION

It is an object of the present invention to provide a polyvinyl acetal resin for lacquer and ink, which can suppress the occurrence of coloring and a foul odor of the polyvinyl acetal resin itself even when no antioxidant is used at all therein, and a lacquer and ink composition which has excellent color and the high stability of viscosity in storing it for long periods.

The first present invention is a polyvinyl acetal resin for lacquer and ink synthesized by acetalization reaction of polyvinyl alcohol and an aldehyde, wherein a polymerization degree is 100 to 3,000, a proportion of a residual acetyl group is 25 mol % or less and a proportion of a residual hydroxyl group is 17 to 35 mol %; a content of the residual aldehyde is 100 ppm or less, a content of residual butyric acid is 100 ppm or less, a content of residual 2-ethyl-2-hexenal is 100 ppm and a content of a residual acidic catalyst is 300 ppm or less, and no antioxidant is remained at all therein.

The second present invention is a polyvinyl acetal resin for lacquer and ink synthesized by acetalization reaction of polyvinyl alcohol and an aldehyde, wherein a polymerization degree is 100 to 3,000, a proportion of a residual acetyl group is 25 mol % or less and a proportion of a residual hydroxyl group is 17 to 35 mol %; a content of the residual aldehyde is 100 ppm or less, a content of residual acetic acid is 100 ppm or less, a content of residual 2-methyl-2-pentenal is 100 ppm, and a content of a residual acid catalyst is 300 ppm or less; and no antioxidant is remained at all therein.

The third present invention is a polyvinyl acetal resin for lacquer and ink synthesized by acetalization reaction of polyvinyl alcohol and an aldehyde, wherein a polymerization degree is 100 to 3,000, a proportion of a residual acetyl group is 25 mol % or less and a proportion of a residual hydroxyl group is 17 to 35 mol %; a content of the residual aldehyde is 100 ppm or less, a content of residual butyric acid is 100 ppm or less, a content of residual acetic acid is 100 ppm or less, a content of residual 2-ethyl-2-hexenal is 100 ppm, a content of residual 2-methyl-2-pentenal is 100 ppm, and a content of a residual acidic catalyst is 300 ppm or less; and no antioxidant is remained at all therein.

The fourth present invention is a lacquer and ink composition which is obtainable by using the polyvinyl acetal resin for lacquer and ink of the first, the second or the third present invention. In the lacquer and ink composition of the fourth present invention, a main solvent is preferably an alcohol solvent.

DETAILED DESCRIPTION OF THE INVENTION

Hereinafter, the present invention is described in detail.

A polyvinyl acetal resin for lacquer and ink of the present invention wherein a polymerization degree is 100 as s lower limit and 3,000 as an upper limit, a proportion of a residual acetyl group thereof is 25 mol % or less, and a proportion of a residual hydroxyl group thereof is 17 mol % as a lower limit and 35 mol % as an upper limit.

When the polymerization degree falls within this range, a pigment is easily dispersed in a lacquer and ink composition to be obtained, and the strength of a coat to be formed becomes higher and further lacquer becomes easy. A preferable lower limit and a preferable upper limit of the polymerization degree are 200 and 1,000, respectively.

When the proportion of the residual acetyl group is larger than 25 mol %, in a lacquer and ink composition to be obtained, viscosity changes and coats tend to block with each other during being stored for long periods and therefore images become indistinct. A preferable proportion of the residual acetyl group is 15 mol % or less.

When the proportion of the residual hydroxyl group is smaller than 17 mol %, a pigment is difficult to disperse and precipitates in a lacquer and ink composition to be obtained and the viscosity of the lacquer and ink composition increases during a storage, and when the proportion of the residual hydroxyl group is larger than 35 mol %, the water resistance and the solvent-solubility of the coat of a lacquer and ink composition to be obtained become insufficient. A preferable proportion and an upper limit of the residual hydroxyl group are 19 mol % and 35 mol %, respectively.

Here, in the present specification, since an acetal group of the polyvinyl acetal resin is formed by acetalization of two hydroxyl groups of polyalcohol resin which is a raw material of the polyvinyl acetal resin, the proportions of the residual acetyl group and the residual hydroxyl group are determined by determining a degree of acetalization (mol %) by a method of counting number of two hydroxyl groups acetalized and calculating based on the value of the degree of acetalization obtained.

Since the polyvinyl acetal resin for lacquer and ink of the present invention is synthesized by acetalization reaction of polyvinyl alcohol and an aldehyde, which uses an acid catalyst, as described below, an unreacted aldehyde and an unreacted acid catalyst remain in the resin. It is considered that carboxylic acid or aldol is prepared by oxidation or aldolization of the residual aldehyde, and this causes the occurrence of coloring and a foul odor of resin and when the resin is used as a lacquer and ink composition, this causes an increase in viscosity and a foul odor during being stored for long periods.

Accordingly, in the polyvinyl acetal resin for lacquer and ink of the present invention, it becomes an effective means for resolving problems of the occurrence of coloring and a foul odor of resin to reduce the contents of the residual aldehyde, butyric acid and acetic acid, being respectively oxides of the residual aldehyde, and 2-ethyl-2-hexenal and 2-methyl-2-pentenal, being respectively aldolization reactants of the residual aldehyde. Additionally, since a residual acid catalyst act as a catalyst of an aldolization reaction of the residual aldehyde, it becomes an effective means for resolving problems of the occurrence of coloring and a foul odor of resin to reduce the content of the residual acid catalyst.

In a polyvinyl acetal resin for lacquer and ink of the first present invention, a content of the residual aldehyde is 100 ppm or less, a content of residual. butyric acid is 100 ppm or less, a content of residual 2-ethyl-2-hexenal is 100 ppm and a content of a residual acidic catalyst is 300 ppm or less.

In a polyvinyl acetal resin for lacquer and ink of the second present invention, a content of the residual aldehyde is 100 ppm or less, a content of residual acetic acid is 100 ppm or less, a content of residual 2-methyl-2-pentenal is 100 ppm and a content of a residual acidic catalyst is 300 ppm or less.

In a polyvinyl acetal resin for lacquer and ink of the third present invention, a content of the residual aldehyde is 100 ppm or less, a content of residual butyric acid is 100 ppm or less, a content of residual acetic acid is 100 ppm or less, a content of residual 2-ethyl-2-hexenal is 100 ppm, a content of residual 2-methyl-2-pentenal is 100 ppm, and a content of a residual acidic catalyst is 300 ppm or less.

In the polyvinyl acetal resin for lacquer and ink of the present invention, no antioxidant is remained at all therein. As described above, in the polyvinyl acetal resin for lacquer and ink of the first present invention, since the content of the residual aldehyde is 100 ppm or less, coloring and a foul odor of resin does not occur even when an antioxidant for the protection of the residual aldehyde from oxidation is not added.

The polyvinyl acetal resin for lacquer and ink of the present invention is prepared by acetalization reaction of polyvinyl alcohol and an aldehyde.

The above-mentioned aldehyde, there are given, for example, aliphatic saturated aldehydes such as formaldehyde, acetaldehyde, n-butyraldehyde, propionaldehyde, isobutyraldehyde, n-valeraldehyde, n-hexyl aldehyde, 2-ethylhexyl aldehyde, n-octyl aldehyde, n-nonyl aldehyde and n-decyl aldehyde; and aromatic aldehydes such as benzaldehyde and cinnamaldehyde. Among them, n-butyraldehyde and acetaldehyde, which are superior in acetalization, are favorably used. These aldehydes may be used alone or in combination of two or more kinds.

A specific method of preparing the polyvinyl acetal resin for lacquer and ink of the present invention is not specifically limited, and, for example, a method of preparing it by reacting the above-mentioned polyvinyl alcohol with the above-mentioned aldehyde in an aqueous solution, an alcohol solution, a mixed solution of water/alcohol, or a dimethylsulfoxide (DMSO) solution using an acid catalyst is given.

The above-mentioned acid catalyst is not specifically limited and either organic acid or inorganic acid can be used, and as the acid catalyst, acetic acid, p-toluenesulfonic acid, nitric acid, sulfuric acid, hydrochloric acid and the like are given.

Furthermore, alkali neutralization is usually conducted to stop the above-mentioned reaction, and as the alkali used for the neutralization, there are given sodium hydroxide, potassium hydroxide, ammonia, sodium nitrate, sodium carbonate, sodium hydrogencarbonate, potassium carbonate, potassium hydrogencarbonate and the like.

It is preferable to wash the polyvinyl acetal resin obtained by the above-mentioned reaction repeatedly with a large amount of water in order to reduce the contents of the residual aldehyde, the residual butyric acid, the residual acetic acid, the residual 2-ethyl-2-hexenal, the residual 2-methyl-2-pentenal and the residual acid catalyst in the obtained polyvinyl acetal resin.

Since the polyvinyl acetal resin for lacquer and ink of the present invention contains many hydroxyl groups in a molecule and these hydroxyl groups adsorb pigment to enhance the dispersibility of the pigment, the storage stability of a composition is very high when the resin is used as a lacquer and ink composition. Additionally, since the contents of the residual aldehyde, the residual butyric acid, the residual acetic acid, the residual 2-ethyl-2-hexenal, the residual 2-methyl-2-pentenal and the residual acid catalyst are below certain amounts, the resin is not colored or does not generate a foul odor although it does not contain the antioxidant at all.

The fourth present invention is a lacquer and ink composition obtained by using the polyvinyl acetal resin for lacquer and ink of the first, the second or the third present invention.

The lacquer and ink composition of the fourth present invention can be prepared by adding a pigment and a solvent, and further an adhesion accelerator, an adhesion retardant, a plasticizer, wax, a compatibility accelerator, a surfactant, a dispersant, a tackifier, and the like, as required to the polyvinyl acetal resin for lacquer and ink of the present invention.

Though the above-mentioned solvent is not specifically limited, alcohol solvents such as ethanol and the like are preferably used as a main solvent from the viewpoint of environmental issues.

The above-mentioned pigment is not specifically limited, there are given, for example, a carbon black, a diazo pigment, a phthalocyanine pigment, a titanium oxide pigment and the like.

Though an amount of the polyvinyl acetal resin for lacquer and ink of the present invention blended in the lacquer and ink composition of the fourth present invention is not specifically limited, it is preferably 5 to 25% by weight and more preferably 10 to 20% by weight. Additionally, the above pigment.is preferably contained in an amount of 20 to 30% by weight in a lacquer and ink composition of a concentrated type and in an amount of 10 to 15% by weight in a finished lacquer and ink composition.

A lacquer and ink composition of the fourth present invention has excellent color and the high stability of viscosity in storing it for long periods because it comprises the polyvinyl acetal resin for lacquer and ink of the present invention. Further, it can also be used as ink for the packaging of foods and pharmaceutical products, since no antioxidant is contained at all therein.

BEST MODE FOR CARRYING OUT THE INVENTION

The present invention is more specifically described with reference to the examples below, but such examples are not intended to limit the scope of the present invention.

EXAMPLE 1

In a five-liter separable flask, after 280 g of polyvinyl alcohol (polymerization degree 230, saponification degree 99.0 mol %) was heated and dissolved in 3200 g of distilled water, this solution was kept at a temperature of 0° C. and 82 g of 35% by weight hydrochloric acid was added to the solution and further 150 g of n-butyraldehyde was added to the solution. A temperature of the solution was raised to 25° C. after one hour from the addition of n-butyraldehyde and the solution was reacted for four hours.

After the completion of a reaction, the resulting resin was washed with distilled water and the washed resin was re-dispersed in distilled water, and the dispersion of the resin was adjusted through addition of sodium hydroxide so as to have a pH of 7. This dispersion was heated to a temperature of 40° C. and kept under this condition for 5 hours and then cooled to a room temperature.

Next, the resulting resin was washed with distilled water of amount of 500 times that of a solid content, and further the washed resin was re-dispersed in distilled water and the dispersion of the resin was kept at 40° C. for 5 hours, and again the resin was washed with distilled water of amount of 500 times, dehydrated and then dried, a polyvinyl acetal resin having white powder form was obtained.

Further, 11 g of the polyvinyl acetal resin which had been left alone at 40° C. for two months was metered and put into a 255 mL glass vessel, and 64 g of ethanol was added to and dissolved the resin, and then 25 g of Rhodamine (red pigment) and 100 g of glass beads were added, and the mixture was stirred for two hours with a mixer to prepare ink.

EXAMPLE 2

A polyvinyl acetal resin and ink were prepared by following the same procedure as that of Example 1 except that polyvinyl alcohol having a polymerization degree of 250 and a saponification degree of 97.0 mol % was used and n-butyraldehyde was used as an aldehyde.

EXAMPLE 3

A polyvinyl acetal resin and ink were prepared by following the same procedure as that of Example 1 except that polyvinyl alcohol having a polymerization degree of 800 and a saponification degree of 99.0 mol % was used and n-butyraldehyde was used as an aldehyde.

EXAMPLE 4

A polyvinyl acetal resin and ink were prepared by following the same procedure as that of Example 1 except that polyvinyl alcohol having a polymerization degree of 300 and a saponification degree of 99.0 mol % was used and n-butyraldehyde and acetaldehyde were used as an aldehyde.

EXAMPLE 5

A polyvinyl acetal resin and ink were prepared by following the same procedure as that of Example 1 except that polyvinyl alcohol having a polymerization degree of 600 and a saponification degree of 99.0 mol % was used and n-butyraldehyde and acetaldehyde were used as an aldehyde.

EXAMPLE 6

A polyvinyl acetal resin and ink were prepared by following the same procedure as that of Example 1 except that polyvinyl alcohol having a polymerization degree of 300 and a saponification degree of 97.0 mol % was used and acetaldehyde was used as an aldehyde.

COMPARATIVE EXAMPLE 1

A polyvinyl acetal resin and ink were prepared by following the same procedure as that of Example 1 except that resin was washed twice with distilled water of amount of 20 times that of a solid content.

COMPARATIVE EXAMPLE 2

A polyvinyl acetal resin was obtained by following the same procedure as that of Example 4 except that resin was washed twice with distilled water of amount of 20 times that of a solid content.

COMPARATIVE EXAMPLE 3

A polyvinyl acetal resin was prepared by following the same procedure as that of Example 6 except that resin was washed twice with distilled water of amount of 20 times that of a solid content, and further an amount of 0.1% by weight of BHT as an antioxidant was added to this polyvinyl acetal resin. Furthermore, ink was prepared by following the same procedure as that of Example 1 using the polyvinyl acetal resin to which an antioxidant was added.

With respect to the polyvinyl acetal resins prepared in Example 1 to 6 and Comparative Example 1 to 3, a degree of acetalization, a proportion of a residual hydroxyl group and a proportion of a residual acetyl group; the contents of the residual aldehyde, residual butyric acid, residual acetic acid, residual 2-ethyl-2-hexenal, residual 2-methyl-2-pentenal and a residual acid catalyst and odors were evaluated, and with respect to the inks prepared in Examples 1 to 6 and Comparative Examples 1 to 3, secular changes and glosses were evaluated using the following procedures. Results of evaluations are shown in Table 1.

Measurements of a Degree of Acetalization, a Proportion of a Residual Hydroxyl Group and a Proportion of a Residual Acetyl Group These are determined by $^1$H-NMR measurements (in DMSO-d$^6$).

(Measurements of the Contents of the Residual Aldehyde, Residual Butyric Acid, Residual Acetic Acid, Residual 2-ethyl-2-hexenal and Residual 2-methyl-2-pentenal)

As measuring equipment, a headspace gas chromatography (SHIMADZU GC-14A) manufactured by Shimadzu Corporation and HS GL SCIENCE Headspace Auto Sampler 7000H were used, an FID type was used as a detector and TC-WX was selected as a column, the contents of the residual aldehyde, residual butyric acid, residual acetic acid, residual 2-ethyl-2-hexenal and residual 2-methyl-2-pentenal were measured by setting HS conditions at 20° C. for 10 minutes and an amount of sample 0.50 g.

(Measurement of the Content of Residual Acid Catalyst)

1 g of polyvinyl acetal resin was weighed precisely and put into an Erlenmeyer flask, and 40 mL of a mixed solvent of ethanol and water (ethanol:water=9:1 (volume ratio)) was added to the resin and the mixture was shaken and dissolved. After dissolving, the solution was titrated to the point where dilute red color was retained over 30 seconds using a micro burette with 0.02 mol/L potassium hydroxide/alcohol solution by use of 1% by weight aqueous solution of phenolphthalein as an indicator. A blank test was conducted separately, and the content of a residual acid catalyst was determined using the following formula (1).

$$\text{Content of acid catalyst (ppm)} \atop \text{(Hydrochloride conversion)} = \frac{(A-B) \times f \times 0.02 \times (36.2/1000)}{\text{sample (g)}} \times 10^6 \quad (1)$$

A: an amount of potassium hydroxide used in the actual test (mL)

B: an amount of potassium hydroxide used in the blank test (mL)

f: a titer of 0.02 mol/L potassium hydroxide/alcohol solution (Evaluation of Odor)

Presence of a foul odor was checked by a sensory analysis.

(Evaluation of Secular Changes in Ink)

The viscosity of ink after 1 day and 7 days from preparation of ink was measured with a B type rotation viscosimeter and secular changes in the viscosity (%) were determined according to the following formula (2).

$$\text{Secular changes (\%)} = \{(\text{viscosity after 7 days} - \text{viscosity after 1 day})/(\text{viscosity after 1 day})\} \times 100 \quad (2)$$

(Evaluation of Gloss of Ink)

Ink was applied to PET film with a bar-coater so as to be 4 to 5 μm in thickness, and a reflectance of 70 degrees was measured and glossiness (%) relative to a gloss reference plane was determined.

pared in Comparative Example 3 was significantly low in the dispersibility of a pigment and very poor in the gloss due to an excessive content of an antioxidant.

INDUSTRIAL APPLICABILTY

In accordance with the present invention, it is possible to provide the polyvinyl acetal resin for lacquer and ink, which can suppress the occurrence of coloring and a foul odor of the polyvinyl acetal resin itself even when no antioxidant is used at all, and the lacquer and ink composition of which has excellent color and the high stability of viscosity in storing it for long periods.

What is claimed is:

1. A method for suppressing the occurrence of coloring and a foul odor of the polyvinyl acetal resin synthesized by acetalization reaction of polyvinyl alcohol and an aldehyde without using an antioxidant, which comprises reducing a content of the residual aldehyde to be 100 ppm or less, a content of residual butyric acid to be 100 ppm or less, a content of residual 2-ethyl-2-hexanal to be 100 ppm, and a content of a residual acid catalyst to be 300 ppm or less.

2. A method for suppressing the occurrence of coloring and a foul odor of the polyvinyl acetal resin synthesized by acetalization reaction of polyvinyl alcohol and an aldehyde without using an antioxidant, which comprises reducing a content of the residual aldehyde to be 100 ppm or less, a content of the residual acetic to be 100 ppm or less, a content of residual

TABLE 1

| | Polyvinyl acetal resin | | | | | | | | | | Ink performance | | |
|---|---|---|---|---|---|---|---|---|---|---|---|---|---|
| | | | | Contents of residual substances (ppm) | | | | | | | | Secular | |
| | Degree of acetalization (mol %) | Residual hydroxyl group (mol %) | Residual acetyl group (mol %) | Aldehyde | Butyric acid | Acetic acid | 2-ethyl-2-hexsenal | 2-methyl-2-pentenal | Acid catalyst | Presence of antioxidant | Presence of foul odor | changes of viscosity (%) | Gloss (%) |
| Example 1 | 70.3 | 28.7 | 1.0 | 10 | 2 | 0 | 30 | 0 | 50 | no | no | 10 | 80 |
| Example 2 | 69.0 | 28.0 | 3.0 | 15 | 1 | 0 | 40 | 0 | 60 | no | no | 15 | 85 |
| Example 3 | 63.0 | 36.0 | 1.0 | 15 | 1 | 0 | 30 | 0 | 40 | no | no | 18 | 80 |
| Example 4 | 72.0 | 27.0 | 1.0 | 10 | 1 | 3 | 20 | 15 | 30 | no | no | 20 | 85 |
| Example 5 | 73.0 | 26.0 | 1.0 | 20 | 0 | 6 | 3 | 35 | 40 | no | no | 21 | 78 |
| Example 6 | 69.0 | 28.0 | 3.0 | 25 | 0 | 8 | 0 | 40 | 30 | no | no | 19 | 80 |
| Comparative Example 1 | 70.3 | 28.7 | 1.0 | 220 | 170 | 110 | 400 | 0 | 1200 | no | yes | 56 | 35 |
| Comparative Example 2 | 72.0 | 27.0 | 1.0 | 250 | 130 | 160 | 260 | 210 | 900 | no | yes | 72 | 28 |
| Comparative Example 3 | 69.0 | 28.0 | 3.0 | 400 | 0 | 60 | 0 | 300 | 1100 | yes | yes | 68 | 12 |

As is apparent from Table 1, the polyvinyl acetal resins prepared in Example 1 to 6 did not have foul odors since the contents of the residual aldehyde, the residual butyric acid, the residual acetic acid, the residual 2-ethyl-2-hexenal, and the residual 2-methyl-2-pentenal thereof were 100 ppm or less and the content of the residual acid catalyst was 300 ppm or less, and the inks prepared by using these polyvinyl acetal resins had less secular changes in viscosity and high storage stability and had also excellent glosses.

On the contrary, the polyvinyl acetal resins prepared in Comparative Example 1 to 3 had foul odors since the contents of residual substances were much due to inadequate washing, and the inks prepared by using these polyvinyl acetal resins had the low stability of viscosity and the dispersibility of a pigment became poor and therefore had poor glosses. Particularly, the polyvinyl acetal resins pre- 2-methyl-2-pentenal to be 100 ppm, and a content of a dual acid catalyst to be 300 ppm or less.

3. A method for suppressing the occurrence of bring and a foul odor of the polyvinyl acetal resin synthesized by acetalization reaction of polyvinyl alcohol and an aldehyde without using an antioxidant, which comprises reducing a content of the residual aldehyde to be 100 ppm or less, a content of residual butyric acid to be 100 or less, a content of residual acetic acid to be 100 ppm or less, a content of residual 2-ethyl-2-hexenal to be 100 ppm, a content of residual 2-methyl-2-pentenal to be 100 ppm, an a content of a residual acidic catalyst to be 300 ppm or less.

* * * * *

UNITED STATES PATENT AND TRADEMARK OFFICE
CERTIFICATE OF CORRECTION

PATENT NO. : 6,936,662 B2  Page 1 of 1
DATED : August 30, 2005
INVENTOR(S) : Yoshitaka Miyake et al.

It is certified that error appears in the above-identified patent and that said Letters Patent is hereby corrected as shown below:

<u>Title page,</u>
Item [57], ABSTRACT,
Line 8, should read "ink synthesized by acetalization reaction of polyvinyl alcohol".

<u>Column 8,</u>
Line 29, should read "acetic acid to be 100 ppm or less, a content of residual".
Line 54, should read "residual acid catalyst to be 300 ppm or less".
Line 55, should read "3. A method for suppressing the occurrence of coloring and".

Signed and Sealed this

Ninth Day of May, 2006

JON W. DUDAS
*Director of the United States Patent and Trademark Office*